Feb. 28, 1928.

W. M. GAMBILL

ATTACHMENT FOR DENTAL ARTICULATORS

Filed Oct. 4, 1926

INVENTOR.
William M. Gambill,
BY
Geo. P. Kimmel.
ATTORNEY.

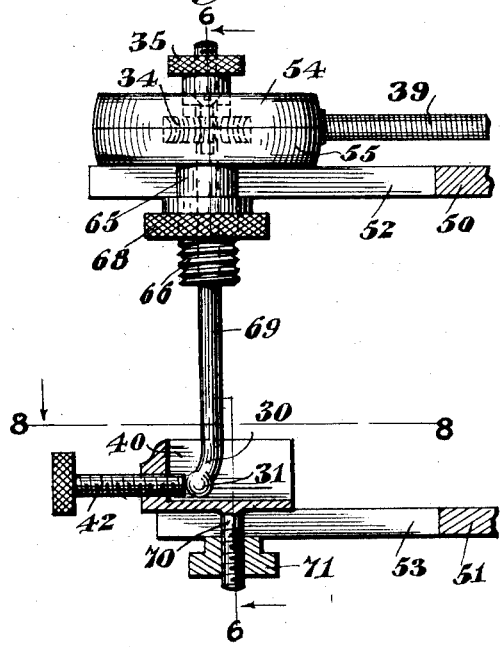
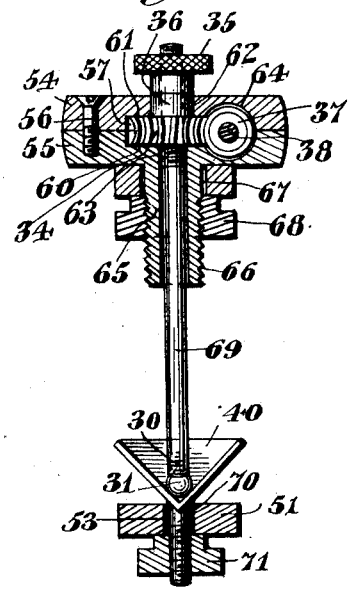
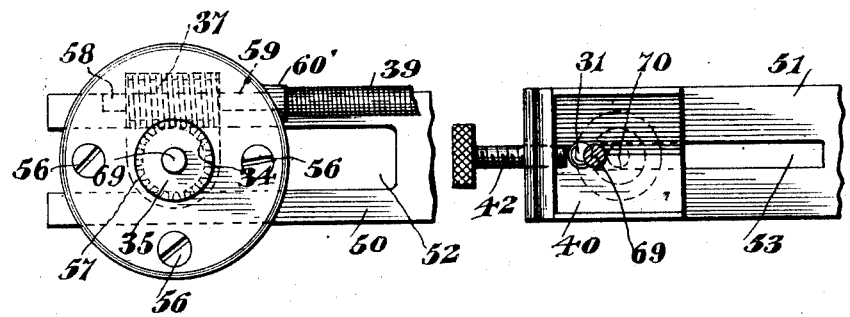
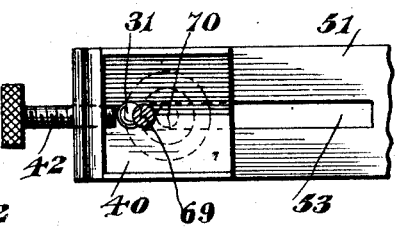

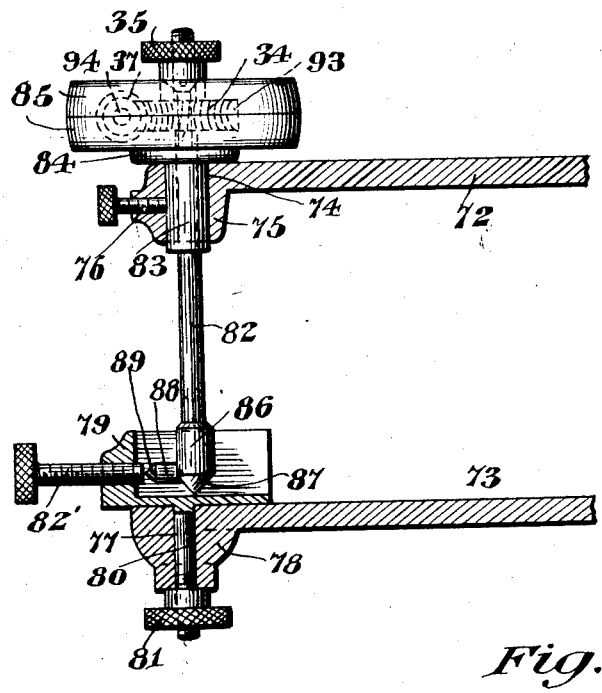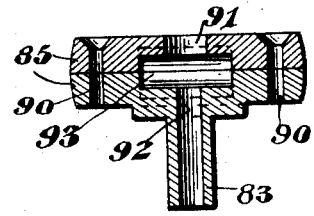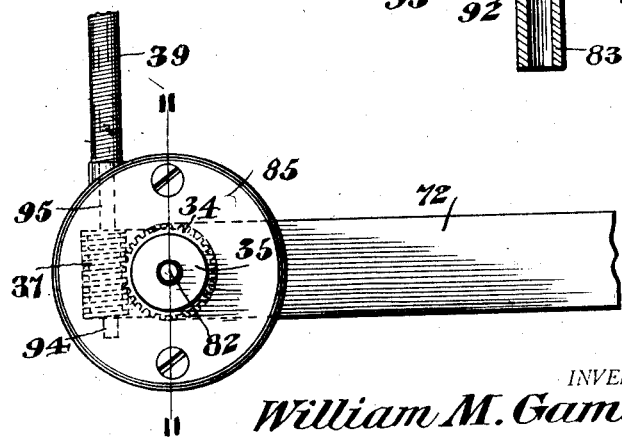

Patented Feb. 28, 1928.

1,661,119

UNITED STATES PATENT OFFICE.

WILLIAM M. GAMBILL, OF MERKEL, TEXAS.

ATTACHMENT FOR DENTAL ARTICULATORS.

Application filed October 4, 1926. Serial No. 139,435.

This invention relates to an attachment for dental articulators, and designed primarily for use in connection with the well known forms of Gysi, Hanau and Wadsworth articulators, but it is to be understood that a dental articulator attachment, in accordance with this invention can be employed in connection with any form of dental articulator for which it is found applicable, and the invention has for its object to provide, in a manner as hereinafter set forth, a dental articulator attachment for imparting combined oscillatory and vertical movements to the articulator during the grinding operation thereof for efficiently grinding in the teeth.

Further objects of the invention are to provide, in a manner as hereinafter set forth, a dental articulator attachment which is comparatively simple in its construction and arrangement, strong, durable, compact, thoroughly efficient in its use, readily installed with respect to the dental articulator, especially the Gysi, Hanau and Wadsworth types of articulators, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 5 is a sectional elevation of a dental articulator attachment, in accordance with this invention showing the adaptation thereof with respect to a dental articulator of the Wadsworth type.

Figure 6 is a section on line 6—6 Figure 6.

Figure 7 is a top plan view of the structure shown in Figure 5.

Figure 8 is a section on line 8—8 Figure 5.

Figure 9 is a sectional elevation of a dental articulator attachment, in accordance with this invention, showing the adaptation thereof in connection with a dental articulator of the Hanau type.

Figure 10 is a top plan view of the structure shown in Figure 9.

Figure 11 is a section on line 11—11 Figure 10 with the gears and hold fast devices omitted.

Figure 1:
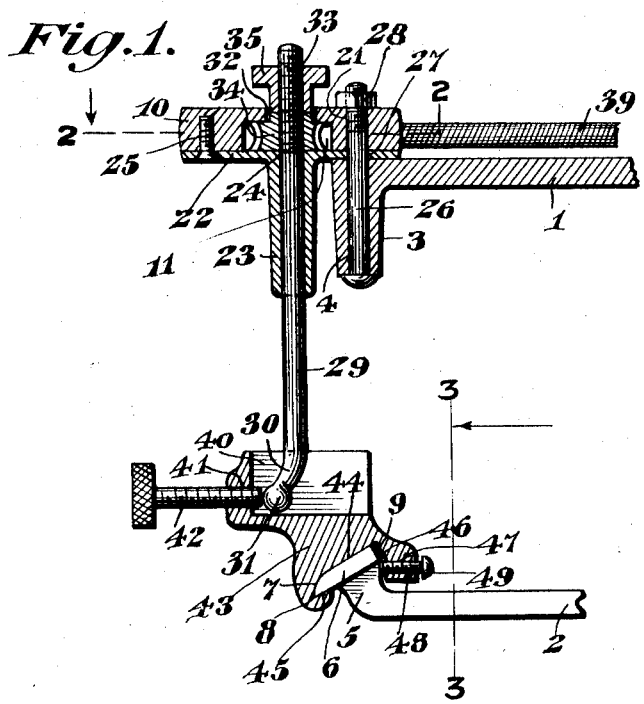
Figure 1 is a vertical sectional view of a dental articulator attachment, in accordance with this invention showing the adaptation thereof with respect to a dental articulator of the Gysi type.

Referring to Figures 1 to 4, 1 denotes the upper and 2 the lower bow of a dental articulator of the Gysi type. The bow 1 at its outer end is formed with a depending sleeve 3 which registers with an opening 4 provided in the outer end of the bow 1. The bow 2 at its outer end is formed with an upwardly extending outwardly inclined arm 5 of appropriate length and which terminates in a head 6 disposed at a downward inclination throughout and further projecting laterally from each side of the arm 5 as well as extending forwardly therefrom. The lower edge of the head 6 is rounded as at 7 to provide a sharp lower corner 8. The upper edge of the head 6 is squared, as at 9, but it is disposed at an upward and forward inclination. The foregoing elements are of known construction and form part of an articular of the Gysi type.

The dental articuator attachment, as illustrated in Figures 1 to 4 comprises a circular case or housing 10 formed with a chamber 11 having a rounded inner wall 12, a squared outer wall 13, a pair of side walls 14 an open bottom 15, and a top wall 16 provided at one end with a concaved portion 17 which is disposed upwardly. The housing 10 is formed with a socket 18 which opens into that part of the chamber 11 arranged below the concaved portion 17 of the top 16 of the chamber 11. The housing 10 is furthermore provided with an opening 19 which opposes the socket 18, communicates with the chamber 11 at that side opposite the side into which the socket 18 opens. An opening 19 extends from the side of the housing 10 to one of the side walls of the chamber 11. The housing 10 is also formed on its side with a boss 20 through which the opening 19 extends. The chamber 11 extends diametrically of the housing 10 and projects from each side of the axis of the latter, but projects a greater distance from one side of the axis than the other side thereof. The housing 10 is also formed with a vertically disposed opening 21 which extends at right angles to the opening 19 and is positioned between one of the side walls of the chamber 11 and the side of the housing 10.

Positioned against the bottom of the housing 10, is a circular closing plate 22 for the open bottom 15 of the chamber 11. The plate 22 axially thereof has formed integral therewith a depending bearing sleeve 23 which registers with an opening 24 provided in the plate 22 centrally thereof. The plate 22 is of the same diameter as the housing 10 and has its edge flush therewith. The plate 22 is secured to the housing 10, by a hold fast device 25 which extends therethrough and is anchored in the housing 10. The plate 22 is also secured to the housing 10 by a vertically disposed coupling bolt 25 which connects the attachment to the upper bow 1 of the articulator. The bolt 25 extends up through the sleeve 3, the opening 27 formed in the plate 22 and through the opening 21 in the housing 10. The head of the bolt 26 abuts against the lower end of the sleeve 3. The shank of the bolt 26 projects above the housing 10 and carries a clamping nut 28 which binds against the top of the housing 10.

The means for oscillating the upper bow 1 comprises a vertically disposed driven shaft 29 formed with an angularly disposed lower terminal portion 30 which terminates in a cam edge 31 of spherical contour. The shaft 29 extends up through the sleeve 23, opening 24 and also through an opening 32 formed in the housing 10 at the top thereof, and which communicates with the chamber 11. The upper terminal portion of the shaft 29 is peripherally threaded, as at 33, and secured therewith is a worm pinion 34 which revolves within the chamber 11 and carries the shaft 29 therewith. A clamping nut 35 is mounted on the upper end of the shaft 33. The hub of the pinion 34 extends into the opening 32 and the nut 35 also extends into the opening 32 and abuts the hub 36 of the pinion 34. The pinion 34 is driven through the medium of a worm 37 which extends transversely at one end of the chamber 11 at that part of the chamber 11 having the top 16 thereof formed with the concaved portion 17. The worm 37 is carried by a drive shaft 38 which is journaled in the opening 19 and also in the socket 18. The drive shaft 38 is connected to a flexible driving member 39 therefor and the latter is operated by any suitable means.

Associated with the cam end 31 of the shaft 29 for the purpose of providing a combined oscillatory and vertical movement or rather combined oscillatory and vertical movements for the shaft 29, imparting a like action to the bow 1, is a V-shaped trough body closed at its forward end by a wall 41. Adjustably engaging with the wall 41 and extending into the trough 40 is a stop or limit screw 42 for the outward movement of the head 31. The trough body is formed with a rearwardly directed depending extension 43 providing a coupling member, and the bottom of said extension 43 is formed with a groove 44 having one of its walls, indicated at 45 overlapping the head 6 at the lower face of the latter. One of the walls of the groove 44, indicated at 46 is extended to provide a lug 47 formed with an opening 48 having a threaded wall. Threadably engaging with the wall of the opening 48, is a binding screw 49, which abuts the rear edge of the arm 5 and provides means for binding the upper face of the head 6, against the base of the groove 44 and the lower face of the head 6, at the forward portion thereof, against the wall 45 of the groove. The extension 43, in connection with the head 6 and binding screw 49 detachably connects the trough body rigidly to the lower bow 2 of the articulator. The oscillatory and vertical movements of the upper bow 1, that is to say which are imparted to the upper bow 1, are obtained by the lower end of the revolving shaft 29 travelling against the side walls of the trough 40.

Referring to Figures 5 to 8 of the drawings the dental articulator attachment, in accordance with this invention, is shown installed with respect to an articulator of the Wadsworth type and such type of articulator includes an upper bow 50 and a lower bow 51. The upper bow projects outwardly with respect to the outer end of the lower bow 51. The upper bow at its outer terminal portion is formed, centrally thereof, with a lengthwise extending slit or slot 52 open at its outer end and the lower bow 51 is also provided, centrally thereof, at its outer terminal portion with a lengthwise extending slit or slot 53 having its outer end open. The attachment as illustrated in Figures 5 to 8 includes a housing or casing formed of an upper and a lower section 54, 55 respectively. The sections 54 and 55 are secured together by hold fast devices 56. The opposed faces of the sections 54, 55 are formed with registering cut away portions to provide a chamber 57, a socket 58 and an opening 59 arranged in alinement with the socket 58. The sections are provided with a hollow tubular boss forming means 60 which forms a continuation of the opening 59. The bottom of the chamber 57 is indicated at 60 and the top thereof at 61. The section 54 axially thereof is formed with a vertically disposed opening 62 which extends through the top 61 of the chamber 57. The section 55 axially thereof is formed with an opening 63 which communicates with the chamber 57 through the bottom 60 thereof. One end of the chamber 57 is of circular contour as indicated at 64. Formed integral with the section 55 and depending therefrom is a tubular sleeve 65 which registers with the opening 63. The periphery of the sleeve 65 for a portion of its length is threaded as at 66 and said threaded part extends from the lower end of the sleeve 65 and terminates at a point removed from the upper end thereof, thereby providing a plane portion 67. The slit or slot 52 in the upper bow 50 of the articulator is of greater width than the slot or slit 53 in the lower bow 51. The housing is mounted upon the upper bow 50 and the sleeve 65 extends through the slot or slit 52. The plane portion 67 of the periphery of the sleeve 65 is arranged within the slit or slot 52, see Figure 6. Threadably engaging with the peripheral threads 66, of the sleeve 65, is a clamping nut 68, which binds against the bow 50, thereby fixedly securing the casing or housing to said bow in a manner as shown in Figures 5 and 6.

The attachment shown in Figures 5, 6 and 7 includes a vertically disposed revoluble shaft 69 constructed in the same manner as the shaft 29, and operated by means similar to that shown in Figure 1 for operating the shaft 29. The operating means for the shaft 69 is provided with the same reference characters as the operating means shown in Figure 1 for the shaft 29. This statement also applies to the lower end of the shaft 69. The drive shaft 38 extends through the opening 59, across the chamber 57 and is journaled into the socket 58.

Figure 3:
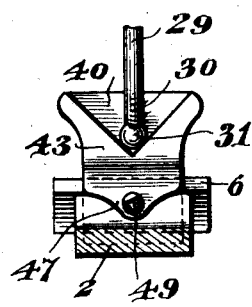
Figure 3 is a section on line 3—3 Figure 1.
Figure 2:
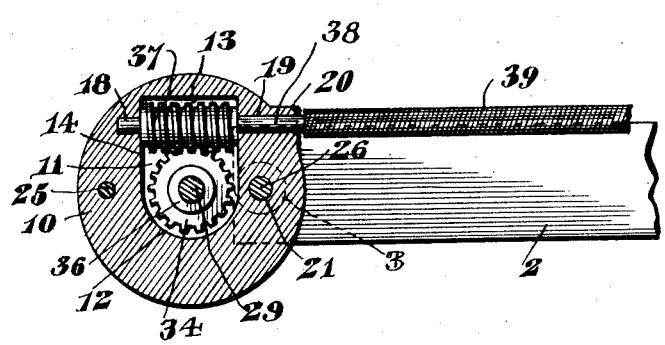
Figure 2 is a section on line 2—2 Figure 1.
Figure 4:
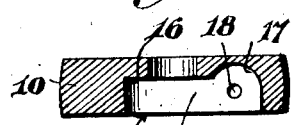
Figure 4 is a detail in vertical section illustrating the upper section of the driving gear casing or housing.

With respect to the attachment shown in Figures 5 to 8, the trough body employed for imparting oscillatory and vertical movements to the shaft 67, is the same as that shown in Figures 1 and 3, with this exception that the coupling member which depends from the trough body is differently constructed from the coupling member 43. In Figures 5, 6 and 8 the trough body is indicated at 50, the adjustable stop screw at 42 and the coupling arm at 70 and the latter consists of a vertically disposed cylindrical bar formed integral with the bottom of the trough body 40 and provided with peripheral threads. The trough body 40 is seated upon the lower bow 51, the coupling member 70 extends through the slot or slit 53, and carries on its lower end a clamping nut 71, which binds against the lower face of the bow 51 whereby the trough body 40 is fixedly secured to the lower bow. Otherwise than that as stated the construction shown in Figures 5, 6, 7 and 8 is the same as that shown and referred to in connection with Figures 1, 2 and 4 of the drawings.

Figures 9 to 11 illustrate the adaptation of a dental articulator attachment, in accordance with this invention, with an articulator of the Hanau type and an articulator of such type includes an upper bow 72 and a lower bow 73. The outer end of the bow 72 is formed with a vertical opening 74 and with a depending collar 75 which registers with the opening 74. A binding screw 76 is carried by the collar 75. The lower bow 73 has its outer end provided with a vertical opening 77 and a depending hollow boss or collar 78 which registers with the opening 77. The attachment illustrated in Figures 9 and 11 includes the same construction of trough body as that illustrated in Figure 5. The trough body is indicated at 79, the coupling extension 80 which depends therefrom extends through the opening 77 and the boss or collar 78, and carries a lock nut 81 on its lower end. The adjustable stop screw carried by the trough body 79 is indicated at 82. The housing for the driving gear for the vertically disposed revoluble shaft 82 is constructed in the same manner as the housing shown in Figure 5, with this exception that the sleeve 83 through which extends the shaft 82 is not provided with peripheral threads. Further the sleeve 83 at its top is formed with a laterally extending annulus flange 84 which is integral with the bottom or lower section of the housing 85 for the driving means for the shaft 82. The flange 84 is seated upon the upper face of the bow 72 and the binding screw 76 fixedly secures sleeve 83 to said bow 72. The housing 85 is constructed similar to the housing shown in Figure 5 and the driving means for the shaft 82 is similar in construction as that shown in Figures 5 and 6 for the shaft 69. The shaft 82 forming a part of the attachment, as shown in Figure 9, has its lower end constructed differently from the lower end of the shaft 29 or 69, but said lower end provides a cam means to impart combined oscillatory and vertical movements to the shaft 82. The lower end of the shaft 82 is enlarged, as at 86, and the enlargement has a pointed terminus 87, and disposed at right angles to the shaft 82, above the pointed terminus 87, is a cylindrical lug 88 having a tapered end 89 and which functions to ride against the walls of the trough body 79, for the purpose of oscillating bodily the shaft 82 which in turn will carry the upper bow 72 therewith. The shaft 72 riding upon the walls of the trough body 79 will provide for a vertical movement and which will be simultaneous with the oscillatory movement. In Figure 11 the housing 85 is shown provided with openings 90 to receive hold fast devices. The axial opening in the upper section of the housing 85 is indicated at 91 and that in the lower section at 92 the latter registers with the sleeve 83. The housing 85 is provided with a chamber 93 of the same contour as the chamber 11 or 7 and the housing 85 is also provided with a socket 94 and an opening 95. The driving means for the shaft 82, is provided with the same reference characters as that employed in Figure 1 to indicate the driving means for the shaft 29.

It is thought that many advantages of a dental articulator attachment, in accordance with this invention, can be readily understood, and although the preferred embodiments of the invention are as illustrated and described, yet it is to be understood that changes in the details of construction thereof can be had which will fall within the scope of the invention as claimed.

What I claim is:

1. Means for imparting combined oscillatory and vertical movements to the upper bow of an articulator comprising the combination with the upper and a lower articulator bow, each of said bows having one end formed with an opening and a depending collar registering with an opening, of a housing mounted on said upper bow and provided with a sleeve extending through the opening and collar of the upper bow, means carried by the collar of the upper bow for securing the housing therewith, a trough mounted upon the lower bow and provided with a depending peripherally threaded coupling member extending through the opening and collar of the lower bow, means carried by said coupling member for clamping the trough to the lower bow, a vertically disposed revoluble shaft extending through said housing and having a cam means on its lower end coacting with the walls of the trough for imparting combined oscillatory and vertical movements to said upper bow, driving means for said shaft mounted within said housing, and means projecting from the housing for operating said driving means.

2. Means for imparting combined oscillatory and vertical movements to the upper bow of an articulator comprising a housing adapted to be mounted upon the upper bow, means for clamping the housing to the upper bow, a trough adapted to be mounted upon the lower bow of the articulator and positioned below said housing, a coupling member depending from said trough, means carried by said coupling member for clamping the trough to the lower bow, a revoluble vertically disposed shaft extending through said housing and having its lower end provided with cam means coacting with the walls of the trough for imparting combined oscillatory and vertical movements to said upper bow, driving means for said shaft within said housing, and means projecting from the housing and exteriorly of the upper bow for operating said driving means.

3. Means for imparting combined oscillatory and vertical movements to the upper bow of an articulator comprising a housing mounted on the top of an end terminal portion of the upper bow, means for fixedly securing said housing to said upper bow, said housing extended above and from the upper bow, a trough adapted to be connected to the lower bow and positioned below said housing, said trough including a depending coupling member, means carried by said coupling member and engaging with the lower bow for fixedly securing the trough thereto, a vertically disposed revoluble shaft extending through said housing and having its lower end provided with a cam means coacting with the walls of the trough for imparting combined oscillatory and vertical movements to the upper bow, means arranged within said housing for driving said shaft, and means projecting from the housing and arranged exteriorly of the upper bow for operating said driving means.

In testimony whereof, I affix my signature hereto.

WILLIAM M. GAMBILL.